(12) United States Patent
de Oliveira et al.

(10) Patent No.: US 12,158,902 B2
(45) Date of Patent: Dec. 3, 2024

(54) TRANSITION-DRIVEN TRANSCRIPT SEARCH

(71) Applicant: Twilio Inc., San Francisco, CA (US)

(72) Inventors: Luke Percival de Oliveira, San Francisco, CA (US); Umair Akeel, San Ramon, CA (US); Alfredo Láinez Rodrigo, Madrid (ES); Nicolas Acosta Amador, San Francisco, CA (US); Sahil Kumar, San Francisco, CA (US); Liat Barda Dremer, Belmont, CA (US); Byeongung Ahn, East Palo Alto, CA (US); Tyler Cole, Diamond Bar, CA (US)

(73) Assignee: Twilio Inc., San Francisco, CA (US)

( * ) Notice: Subject to any disclaimer, the term of this patent is extended or adjusted under 35 U.S.C. 154(b) by 290 days.

(21) Appl. No.: 17/305,976

(22) Filed: Jul. 19, 2021

(65) Prior Publication Data
US 2022/0156296 A1    May 19, 2022

Related U.S. Application Data

(60) Provisional application No. 63/115,211, filed on Nov. 18, 2020.

(51) Int. Cl.
G06F 40/169    (2020.01)
G06F 16/332    (2019.01)
(Continued)

(52) U.S. Cl.
CPC ........ G06F 16/3322 (2019.01); G06F 16/383 (2019.01); G06F 40/169 (2020.01);
(Continued)

(58) Field of Classification Search
None
See application file for complete search history.

(56) References Cited

U.S. PATENT DOCUMENTS 3,568,155 A    3/1971  Abraham et al.
5,384,703 A    1/1995  Withgott et al.
(Continued)

FOREIGN PATENT DOCUMENTS

WO    2022086939    4/2022

OTHER PUBLICATIONS

"U.S. Appl. No. 17/447,039, Non Final Office Action mailed Aug. 16, 2022", 10 pgs.
(Continued)

*Primary Examiner* — Jesse S Pullias
(74) *Attorney, Agent, or Firm* — Schwegman Lundberg & Woessner, P.A.

(57) ABSTRACT

Methods, systems, and computer programs are presented for searching the content of voice conversations. The conversations are translated into text and analysis of the conversation is performed to identify information in the conversation. The information identified includes turns taking data in the conversation and states identified within each state. A powerful user interface (UI) is provided to review the conversations and add annotations that tag the different turns. Additionally, parameter values are extracted from the text. A powerful search engine is provided with multiple search options, such as searching for text, searching by state within the conversation, searching by parameters extracted from the conversation, or a combination thereof.

17 Claims, 16 Drawing Sheets

(51) Int. Cl.
* G06F 16/383 (2019.01)
* G06F 40/295 (2020.01)
* G06N 20/00 (2019.01)
* G10L 15/26 (2006.01)

(52) U.S. Cl.
CPC .......... *G06F 40/295* (2020.01); *G06N 20/00* (2019.01); *G10L 15/26* (2013.01)

(56) References Cited

U.S. PATENT DOCUMENTS

| | | | |
|---|---|---|---|
| 5,945,933 A | 8/1999 | Kalkstein | |
| 6,138,139 A | 10/2000 | Beck et al. | |
| 6,567,805 B1 | 5/2003 | Johnson et al. | |
| 7,702,508 B2 | 4/2010 | Bennett | |
| 7,725,321 B2 | 5/2010 | Bennett | |
| 7,801,910 B2 | 9/2010 | Houh et al. | |
| 8,428,227 B2 | 4/2013 | Angel et al. | |
| 8,494,133 B2 | 7/2013 | Jeffs et al. | |
| 8,775,165 B1 | 7/2014 | Oikawa | |
| 8,798,242 B1* | 8/2014 | Sankaranarayanan | H04M 3/51 379/265.03 |
| 8,942,359 B2 | 1/2015 | Seetharaman et al. | |
| 8,983,975 B2 | 3/2015 | Kenton et al. | |
| 9,880,807 B1 | 1/2018 | Haggerty et al. | |
| 9,910,909 B2 | 3/2018 | Hegde et al. | |
| 9,965,726 B1 | 5/2018 | Tablan et al. | |
| 10,089,639 B2 | 10/2018 | Kannan et al. | |
| 10,388,272 B1 | 8/2019 | Thomson et al. | |
| 10,453,455 B2 | 10/2019 | Manuvinakurike et al. | |
| 10,467,339 B1 | 11/2019 | Shen | |
| 10,839,335 B2 | 11/2020 | Weisman et al. | |
| 11,165,900 B2 | 11/2021 | Sachdev | |
| 11,170,154 B1 | 11/2021 | Van Dyke et al. | |
| 11,170,175 B1 | 11/2021 | Kohli et al. | |
| 11,475,210 B2 | 10/2022 | De Oliveira et al. | |
| 11,568,231 B2 | 1/2023 | Meteer et al. | |
| 11,765,267 B2 | 9/2023 | Cole et al. | |
| 11,809,804 B2 | 11/2023 | Láinez Rodrigo et al. | |
| 11,848,025 B2 | 12/2023 | Proenca et al. | |
| 11,941,348 B2 | 3/2024 | de Oliveira et al. | |
| 11,947,872 B1 | 4/2024 | Mahler-Haug et al. | |
| 2002/0046018 A1 | 4/2002 | Marcu et al. | |
| 2007/0133437 A1 | 6/2007 | Wengrovitz et al. | |
| 2009/0030894 A1* | 1/2009 | Mamou | G06F 16/3343 707/999.005 |
| 2010/0104086 A1* | 4/2010 | Park | H04M 3/51 379/265.09 |
| 2010/0332477 A1* | 12/2010 | Jeffs | G06Q 30/02 707/738 |
| 2013/0007037 A1 | 1/2013 | Azzam et al. | |
| 2014/0169547 A1* | 6/2014 | Murgai | G06F 16/61 379/265.03 |
| 2015/0032448 A1* | 1/2015 | Wasserblat | G06F 16/60 704/235 |
| 2015/0046783 A1 | 2/2015 | O'donoghue et al. | |
| 2015/0106091 A1* | 4/2015 | Wetjen | G10L 15/26 704/235 |
| 2015/0181020 A1* | 6/2015 | Fitzsimmons | H04M 3/42221 379/67.1 |
| 2015/0256677 A1* | 9/2015 | Konig | H04M 3/5191 379/265.09 |
| 2016/0092792 A1 | 3/2016 | Chandrasekaran et al. | |
| 2018/0113854 A1* | 4/2018 | Vig | H04M 3/51 |
| 2018/0143956 A1 | 5/2018 | Skarbovsky et al. | |
| 2018/0332165 A1* | 11/2018 | Cunningham | H04L 65/80 |
| 2019/0121852 A1 | 4/2019 | Applegate et al. | |
| 2019/0392837 A1* | 12/2019 | Jung | H04L 12/1831 |
| 2020/0279017 A1 | 9/2020 | Norton et al. | |
| 2021/0158805 A1* | 5/2021 | Sivasubramanian | G06N 5/04 |
| 2021/0335367 A1* | 10/2021 | Graff | G06F 40/20 |
| 2022/0067269 A1 | 3/2022 | De Oliveira et al. | |
| 2022/0121884 A1 | 4/2022 | Zadeh et al. | |
| 2022/0156460 A1 | 5/2022 | Láinez Rodrigo et al. | |
| 2022/0210268 A1 | 6/2022 | Cole et al. | |
| 2022/0261631 A1 | 8/2022 | Cohen et al. | |
| 2022/0382959 A1 | 12/2022 | Láinez Rodrigo et al. | |
| 2022/0414319 A1 | 12/2022 | De Oliveira et al. | |
| 2023/0388413 A1 | 11/2023 | Cole et al. | |
| 2024/0020458 A1 | 1/2024 | Láinez Rodrigo et al. | |
| 2024/0037418 A1 | 2/2024 | Durairaj et al. | |
| 2024/0152689 A1 | 5/2024 | de Oliveira et al. | |

OTHER PUBLICATIONS

"U.S. Appl. No. 17/447,039, Examiner Interview Summary mailed Nov. 7, 2022", 2 pgs.

"U.S. Appl. No. 17/304,081, Notice of Allowance mailed Jun. 9, 2022", 9 pgs.

"U.S. Appl. No. 17/304,081, Notice of Allowability mailed Jul. 20, 2022", 2 pgs.

"U.S. Appl. No. 17/447,039, Response filed Apr. 21, 2023 to Final Office Action mailed Feb. 21, 2023", 11 pgs.

"U.S. Appl. No. 17/447,039, Notice of Allowance mailed May 12, 2023", 11 pgs.

"U.S. Appl. No. 17/939,176, Non Final Office Action mailed Jun. 15, 2023", 8 pgs.

U.S. Appl. No. 17/447,039, filed Sep. 7, 2021, Tool for Annotating and Reviewing Audio Conversations.

U.S. Appl. No. 17/304,081, filed Jun. 14, 2021, Language Model for Abstractive Summarization.

U.S. Appl. No. 17/449,405, filed Sep. 29, 2021, Tool for Categorizing and Extracting Data From Audio Conversations.

U.S. Appl. No. 17/303,279, filed May 26, 2021, Text Formatter.

"U.S. Appl. No. 17/447,039, Response filed Nov. 16, 2022 to Non Final Office Action mailed Aug. 16, 2022", 11 pgs.

"U.S. Appl. No. 17/447,039, Final Office Action mailed Feb. 21, 2023", 11 pgs.

U.S. Appl. No. 17/939,176, filed Sep. 7, 2022, Language Model for Abstractive Summarization.

Ba, Jimmy Lei, "Layer Normalization", arXiv preprint, arXiv:1607.06450v1 [stat.ML], (Jul. 21, 2016), 14 pgs.

Celikyilmaz, Asli, "Deep Communicating Agents for Abstractive Summarization", arXiv preprint, arXiv:1803.10357v3 [cs.CL], (Aug. 15, 2018), 14 pgs.

Chopra, Sumit, "Abstractive Sentence Summarization with Attentive Recurrent Neural Networks", Proceedings of the NAACL-HLT16, (2016), 93-98.

Dai, "Semi-supervised Sequence Learning", arXiv preprint, arXiv:1511.01432 [cs.LG], (Nov. 4, 2015), 10 pgs.

Devlin, Jacob, "BERT: Pre-training of Deep Bidirectional Transformers for Language Understanding", arXiv preprint, arXiv:1810.04805 [cs.CL], (2018), 14 pgs.

Gehrmann, Sebastian, "Bottom-Up Abstractive Summarization", arXiv preprint, arXiv:1808.10792v2 [cs.CL], (Oct. 9, 2018), 12 pgs.

Gu, Jiatao, "Incorporating Copying Mechanism in Sequence-to-Sequence Learning", arXiv preprint, arXiv:1603.06393v3 [cs.CL], (Jun. 8, 2016), 10 pgs.

Holtzman, Ari, "The Curious Case of Neural Text Degeneration", 8th International Conference on Learning Representations (ICLR), (Apr. 2020), 16 pgs.

Howard, Jeremy, "Universal Language Model Fine-tuning for Text Classification", arXiv preprint, arXiv:1801.06146v5 [cs.CL], (May 23, 2018), 12 pgs.

Kingma, Diederik P, "Adam: A Method for Stochastic Optimization", arXiv preprint, arXiv:1412.6980v9 [cs.LG], (Jan. 30, 2017), 15 pgs.

Kudo, Taku, "SentencePiece: A simple and language independent subword tokenizer and detokenizer for Neural Text Processing", arXiv preprint, arXiv:1808.06226v1 [cs.CL], (Aug. 19, 2018), 6 pgs.

Li, Piji, "Actor-Critic based Training Framework for Abstractive Summarization", arXiv preprint, arXiv:1803.11070v2 [cs.CL], (Aug. 15, 2018), 10 pgs.

Lin, Chin-Yew, "Rouge: A Package for Automatic Evaluation of Summaries", Text Summarization Branches Out: Proceedings of the ACL-04 Workshop, Barcelona, Spain., (2004), 8 pgs.

(56) References Cited

OTHER PUBLICATIONS

Liu, Peter J, "Generating Wikipedia by Summarizing Long Sequences", arXiv preprint, arXiv:1801.10198v1 [cs.CL], (Jan. 30, 2018), 18 pgs.
Lloret, Elena, "The Challenging Task of Summary Evaluation: An Overview", Author preprint, Language Resources and Evaluation, 52:1, 101-148, (2017), 54 pages.
Nallapati, Ramesh, "Abstractive Text Summarization using Sequence-to-sequence RNNs and", arXiv preprint, arXiv:1602.06023v5 [cs.CL], (Aug. 26, 2016), 12 pgs.
Narayan, Shashi, "Don't Give Me the Details, Just the Summary.", arxiv prepint, arixiv 1808.08745v1 cs.cl, (Aug. 27, 2018), 11 pages.
Paulus, Romain, "A Deep Reinforced Model for Abstractive Summarization", arXiv:1705.04304v3 [cs.CL], (Nov. 13, 2017), 12 pgs.
Peters, Matthew, "Deep contextualized word representations", Proceedings of the 2018 Conference of the North American Chapter of the Association for Computational Linguistics: Human Language Technologies, vol. 1 Long Papers, (2018), 11 pgs.
Radford, Alec, "Improving Language Understanding Generative Pre-Training", author preprint, (2018), 12 pgs.
Radford, Alec, "Language Models are Unsupervised Multitask Learners", author preprint, (2018), 24 pgs.
Rush, Alexander M, "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, "Get To The Point: Summarization with Pointer-Generator Networks", arXiv preprint, arXiv:1704.04368v2 [cs.CL], (Apr. 25, 2017), 20 pgs.
Sennrich, Rico, "Neural Machine Translation of Rare Words with Subword Units", arXiv preprint, arXiv:1508.07909v5 [cs.CL], (Jun. 10, 2016), 11 pgs.
Sutskever, Ilya, "Sequence to Sequence Learning with Neural Networks", arXiv preprint, arXiv:1409.3215v3 [cs. CL], (Dec. 14, 2014), 9 pgs.
Tu, Zhaopeng, "Modeling Coverage for Neural Machine Translation", arXiv preprint, arXiv:1601.04811v6 [cs.CL], (Aug. 6, 2016), 11 pgs.
Vaswani, Ashish, "Attention is All You Need", 31st Conference on Neural Information Processing Systems (NIPS), arXiv:1706.03762v5 [cs.CL], (Dec. 6, 2017), 15 pgs.
Vinyals, Oriol, "Pointer Networks", arXiv preprint, arXiv:1506.03134v2 [stat.ML], (Jan. 2, 2017), 9 pgs.
Wu, Yonghui, "Googles Neural Machine Translation System: Bridging the Gap between Human and Machine Translation", arXiv preprint, arXiv:1609.08144v2 cs.CL, (Oct. 8, 2016), 23 pgs.
Zeng, Wenyuan, "Efficient Summarization with Read-Again and Copy Mechanism", arXiv preprint, arXiv:1611.03382v1 [cs.CL], (Nov. 10, 2016), 11 pgs.
U.S. Appl. No. 18/448,675, filed Aug. 11, 2023, Tool for Annotating and Reviewing Audio Conversations.
U.S. Appl. No. 18/373,450, filed Sep. 27, 2023, Text Formatter.
"U.S. Appl. No. 17/303,279, Notice of Allowance mailed Aug. 24, 2023", 11 pgs.
"U.S. Appl. No. 17/939,176, Response filed Sep. 14, 2023 to Non Final Office Action mailed Jun. 15, 2023", 8 pgs.
"U.S. Appl. No. 17/939,176, Notice of Allowance mailed Nov. 8, 2023", 8 pgs.
"U.S. Appl. No. 17/449,405, Non Final Office Action mailed Nov. 27, 2023", 12 pgs.
Efstathiou, "Semantic Source Code Models Using Identifier Embeddings", IEEE ACM 16th International Conference on Mining Software Repositories (MSR), (2019), 29-33.
"U.S. Appl. No. 17/449,405, Examiner Interview Summary mailed Jan. 24, 2024", 2 pgs.
"U.S. Appl. No. 17/449,405, Notice of Allowance mailed Apr. 29, 2024", 15 pgs.
"U.S. Appl. No. 17/449,405, Response filed Feb. 27, 2024 to Non Final Office Action mailed Nov. 27, 2023", 12 pgs.
"U.S. Appl. No. 17/939,176, Supplemental Notice of Allowability mailed Feb. 21, 2024", 3 pgs.
"U.S. Appl. No. 18/373,450, Non Final Office Action mailed Jun. 17, 2024", 19 pgs.
"U.S. Appl. No. 18/448,675, Non Final Office Action mailed Mar. 12, 2024", 8 pgs.
"U.S. Appl. No. 18/448,675, Response filed Jun. 12, 2024 to Non Final Office Action mailed Mar. 12, 2024", 9 pgs.
"U.S. Appl. No. 18/448,675, Notice of Allowance mailed Jul. 5, 2024", 12 pgs.

* cited by examiner

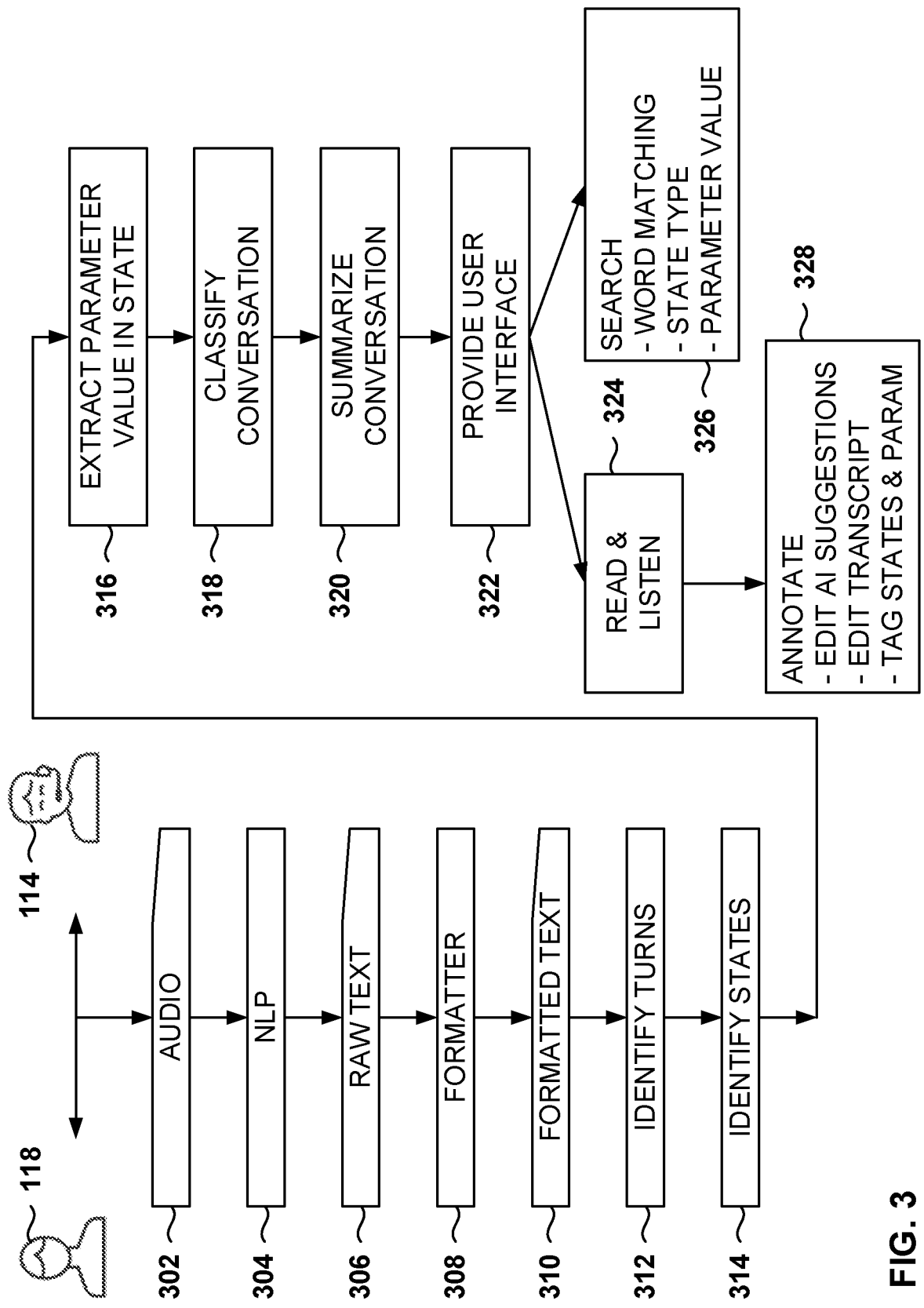

| FIND KEYWORDS AND PHRASES | 🔍 | | GUIDELINES ⚙ |

NAME AGENT
1 OF THE LEADING LIFE INSURANCE SERVICES IN AMERICA AND HELP OVER 10000 PEOPLE EACH MONTH ON THE RIGHT POLICY. I [INAUDIBLE] PERSONALIZED PLAN. THE MESSAGES. YOU NEED SOME BUDGET. AS I SAID, MY NAME IS [BRITTNEY] I'M A SENIOR LICENSE AGENT THAT SPECIALIZES IN YOUR AREA, AND MY JOB IS JUST BE YOUR ADVOCATING GUIDE. YOU TO THE RIGHT PLAN BASICALLY NEEDS FOR LIFE INSURANCE. NOW, ARE YOU LOOKING AT RATES FOR YOURSELF? OR DID YOU NEED COVERAGE FOR OTHERS AND YOUR FAMILY AS WELL?

CUSTOMER 0:01:26 | YES. MYSELF.

AGENT 0:01:28 | OKAY, AND LET ME SEE HERE. ARE YOU CURRENTLY EMPLOYED? RETIRED ON SOCIAL SECURITY DISABILITY?

CUSTOMER 0:01:36 | OH GOD [INAUDIBLE] QUESTIONS AGAIN. I ALREADY ANSWERED THEM TWICE.

AGENT 0:01:41 | OKAY, DID YOU ALREADY?

CUSTOMER 0:01:42 | I'M RETIRED.

AGENT 0:01:44 | OKAY, I'M SORRY ABOUT THAT. OR DID YOU ALREADY SPEAK WITH SOMEBODY?

CUSTOMER 0:01:46 | WELL, 1 PERSON CALL ME IN THE MIDDLE OF ME FILLING OUT THE APPLICATION ONLINE. I COULDN'T FINISH THAT. THEN SHE TOOK ALL THE INFORMATION. THEN SHE TRANSFER IT TO SOMEBODY ELSE. AFTER SHE MADE ME WAIT, AND THEN THE SECOND I TOOK THE INFORMATION AGAIN AND SHE MADE ME WAIT EVEN LONGER, AND NOW HERE WITH YOU. YOU'RE S. CAN YOU SAY QUESTIONS?

SID: GT9BB1C0241 2A582D2266 5C0729BD2287

CHECKLIST

ANNOTATIONS
NAMEAGENT X1    2
NOTICENUM X2    0
RECORDING X3    1
DEPENDENTS X4   0
PROFANITY X5    0

NOTICE NUMBER
VAB00000000  ⊖

CALL OUTCOME
SELECT OUTCOME ⌄

CALL SENTIMENT
SELECT SENTIMENT ⌄

COMPLETE

| FIND KEYWORDS AND PHRASES | 🔍 |   | GUIDELINES ⚙ |

AGENT 0:00:07
NAMEAGENT
THIS IS BRITNEY. I'M A SENIOR AGENT AND INSURANCE. I CAN HELP YOU FIND COVERAGE AND WE ARE
RECORDING
ON A RECORDED LINE. ARE YOU DOING TODAY?

CUSTOMER 0:00:17
WELL, THANK YOU. HOW ABOUT YOURSELF?

AGENT 0:00:20
DOING GOOD. THANKS FOR ASKING. DO YOU CURRENTLY HAVE ANY LIFE INSURANCE?

CUSTOMER 0:00:26
NO.

AGENT 0:00:28
OKAY. WELL, I JUST WANNA MAKE SURE YOU HAVE SOME BACKGROUND INFORMATION ON US. WE ARE
1 OF THE LEADING LIFE INSURANCE SERVICES IN AMERICA AND HELP OVER 10000 PEOPLE EACH
MONTH ON THE RIGHT POLICY. [INAUDIBLE] PERSONALIZED PLAN. THE MESSAGES. YOU NEED SOME
BUDGET. AS I SAID, MY NAME IS BRITNEY. I'M A SENIOR LICENSE AGENT THAT SPECIALIZES IN YOUR
AREA, AND MY JOB IS JUST BE Y⎡                          ⎤ YOU TO THE RIGHT PLAN BASICALLY NEEDS FOR
LIFE INSURANCE. NOW, ARE YO│ FIND TAG...  NAMEAGENT X1 │ YOURSELF? OR DID YOU NEED COVERAGE FOR
OTHERS AND YOUR FAMILY AS  │             NOTICENUM  X2 │
                           │             RECORDING  X3 │—502
                           │             DEPENDENTS X4 │
                           │             PROFANITY  X5 │
                           ⎣                          ⎦

CUSTOMER 0:01:26
YES. MYSELF.

AGENT 0:01:28
OKAY, AND LET ME SEE HERE EMPLOYED? RETIRED ON SOCIAL SECURITY
DISABILITY?

CUTOMER 0:01:36
OH GOD [INAUDIBLE] QUESTIONS AGAIN. I ALREADY ANSWERED THEM TWICE.

---

SID: GT9BB1C02412A582D2686C0729EBD2287

CHECKLIST
ANNOTATIONS

NAMEAGENT   X1   1
NOTICENUM   X2   0
RECORDING   X3   1
DEPENDENTS  X4   0
PROFANITY   X5   0

NOTICE NUMBER
VAB00000000  ⊕

CALL OUTCOME
SELECT OUTCOME ⌄

CALL SENTIMENT
SELECT SENTIMENT ⌄

[ COMPLETE ]

| FIND KEYWORDS AND PHRASES 🔍 | GUIDELINES ⚙ |

1 OF THE LEADING LIFE INSURANCE SERVICES IN AMERICA AND HELP OVER 10000 PEOPLE EACH MONTH ON THE RIGHT POLICY. I [INAUDIBLE] PERSONALIZED PLAN. THE MESSAGES. YOU NEED SOME
[NAME AGENT]
BUDGET. AS I SAID, MY NAME IS BRITTNEY. I'M A SENIOR LICENSE AGENT THAT SPECIALIZES IN YOUR AREA, AND MY JOB IS JUST BE YOUR ADVOCATING GUIDE. YOU TO THE RIGHT PLAN BASICALLY NEEDS FOR LIFE INSURANCE. NOW, ARE YOU LOOKING AT RATES FOR YOURSELF? OR DID YOU NEED COVERAGE FOR OTHERS AND YOUR FAMILY AS WELL?

CUSTOMER 0:01:26    YES. MYSELF.

AGENT 0:01:28    OKAY, AND LET ME SEE HERE. ARE YOU CURRENTLY EMPLOYED? RETIRED ON SOCIAL SECURITY DISABILITY?

CUSTOMER 0:01:36    OH GOD [INAUDIBLE] QUESTIONS AGAIN. I ALREADY ANSWERED THEM TWICE.

AGENT 0:01:41    OKAY. DID YOU ALREADY?

CUSTOMER 0:01:42    I'M RETIRED.

AGENT 0:01:44    OKAY, I'M SORRY ABOUT THAT. OR DID YOU ALREADY SPEAK WITH SOMEBODY?

CUSTOMER 0:01:46    WELL, 1 PERSON CALL ME IN THE MIDDLE OF ME FILLING OUT THE APPLICATION ONLINE. I COULDN'T FINISH THAT. THEN SHE TOOK ALL THE INFORMATION. THEN SHE TRANSFER IT TO SOMEBODY ELSE. AFTER SHE MADE ME WAIT, AND THEN THE SECOND I TOOK THE INFORMATION AGAIN AND SHE MADE ME WAIT EVEN LONGER. AND NOW HERE WITH YOU. YOU'RE S. CAN YOU SAY QUESTIONS?

SID: GT99B1C024 12A582D266 5CD729 BD2287

CHECKLIST

ANNOTATIONS
NAMEAGENT   X1   2
NOTICENUM   X2   0
RECORDING   X3   1
DEPENDENTS  X4   0
PROFANITY   X5   0

NOTICE NUMBER
VAB0000000 ⊙

CALL OUTCOME
SELECT OUTCOME ⌄

CALL SENTIMENT
POSITIVE
NEUTRAL
✓ NEGATIVE

— 602

[COMPLETE]

FIG. 7

*Screen 700 contents:*

00:00 / 06:41

FIND KEYWORDS AND PHRASES  |  0/0

GUIDELINE

| Time | K | Transcript |
|---|---|---|
| 0:00:00.99 | 0 | › HELLO, THIS IS [INAUDIBLE]. |
| 0:00:02.10 | 1 | › HELLO? |
| 0:00:05.36 | 1 | › HI, DAVID WITH INSURANCECO. HAVE A MICHAEL COOPER ONLINE INTERESTED IN LIFE INSURANCE. AND I'LL INTRODUCE, YOU KNOW |
| 0:00:11.01 | 0 | › THANK YOU. |
| 0:00:13.43 | 1 | › YOU'RE WELCOME. ALL RIGHT, MR. COOPER, THANK YOU SO MUCH FOR HOLDING. I DO HAVE ARE LICENSED AGENT ONLINE. HELL TAKE IT FROM HERE AND YOU BOTH HAVE A GREAT REST OF YOUR DAY. |
| 0:00:21.51 | 0 | › THANK YOU. |
| 0:00:21.56 | 1 | › ALL RIGHT. THANK YOU, YOU TOO. THANKS. |
| 0:00:24.76 | 0 | › HI, MR. MICHAEL. THIS IS CLARENCE. I'M A SENIOR AGENT AT INSURANCECO. AND I CAN HELP YOU FIND COVERAGE. [HES] DO WANNA MENTION THAT [WE OWN A RECORDED LINE] NEED TO VALIDATE YOUR DATA BIRTH, SIR? |
| 0:00:40.85 | 1 | › OKAY. |
| 0:00:43.32 | 0 | › IS THE 0 6 0 5 AT [HES] AT WHAT YEAR? |
| 0:00:50.66 | 1 | › 19 56. |
| 0:00:52.10 | 0 | › THANK YOU, SIR. OKAY. |
| 0:00:55.04 | 0 | › I SEE THAT YOU DO CURRENTLY HAVE LIFE INSURANCE. OR ARE YOU LOOKING TO REPLACE WHAT YOU HAVE OR TO ADD TO YOUR COVERAGE? |
| 0:01:03.18 | 1 | › NO, DAD. |
| 0:01:05.38 | 0 | › OKAY. GREAT. HAVE YOU EVER PURCHASED FROM INSURANCECO BEFORE? |
| 0:01:11.27 | 1 | › NO. |
| 0:01:12.91 | 0 | › GREAT. WELL, LET ME GIVE YOU A LITTLE BACKGROUND INSURANCECO. [HES] IS 1 OF THE LEADING LIFE INSURANCE SERVICES IN AMERICA. WE HELP OVER 10000 PEOPLE EACH MONTH. FIND THE RIGHT POLICY THAT MATCHES THEIR NEEDS IN THEIR BUDGET. [HES] I AM LICENSE IN THE STATE OF CALIFORNIA AND I CAN GUIDE YOU THROUGH THAT PROCESS OF ADDING TO YOUR COVERAGE. |

SID: GT9B81C02412A582D286I5CD729BD2287

CHECKLIST

ANNOTATIONS
- LICENSE STATUS STATEMENT X1: 0
- INCORRECT LICENSE STATUS STATEMENT X2: 0
- STATUS WHERE LICENSED X3: 1
- AGENT PRODUCED SELF X4: 1
- RECORDED LINE DISCLOSURE X5: 1

SENTIMENT: POSITIVE | NEUTRAL | NEGATIVE

FLAGS
- ☐ VOICE MAIL

CALL OUTCOME: NO ANSWER

[COMPLETE]

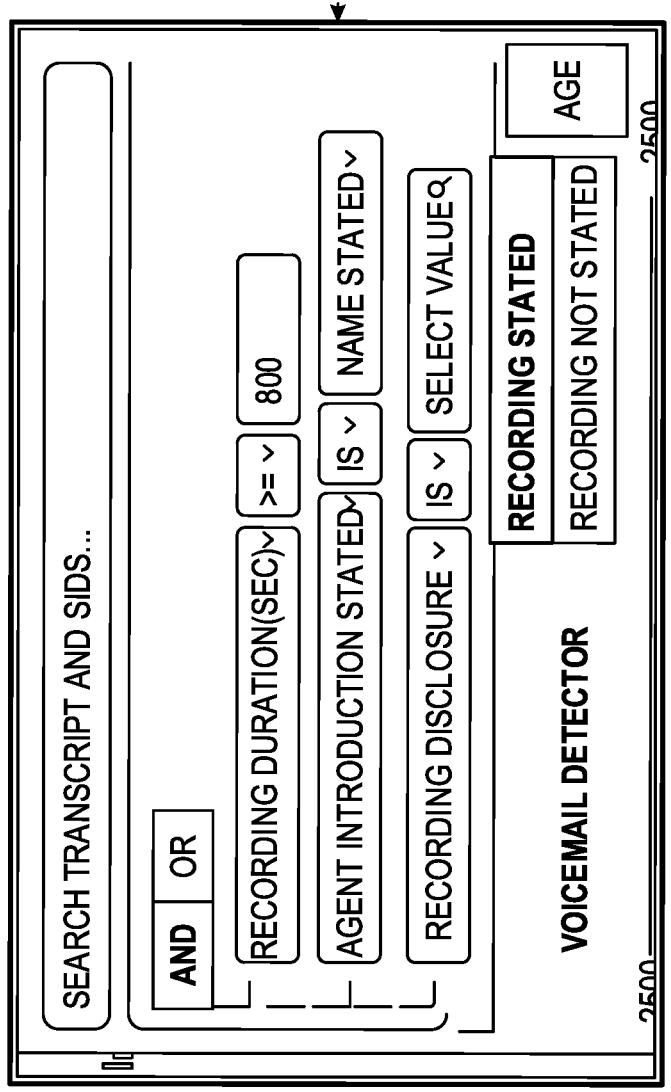
FIG. 10

TRANSITION-DRIVEN TRANSCRIPT SEARCH

CLAIM FOR PRIORITY

This application claims the benefit of priority to U.S. Provisional Patent Application Ser. No. 63/115,211 filed Nov. 18, 2020, which is incorporated by reference herein in its entirety.

TECHNICAL FIELD

The subject matter disclosed herein generally relates to methods, systems, and machine-readable storage media for techniques to search audio conversations.

BACKGROUND

Contact centers have operators that provide support to clients, sometimes via voice or video conversations that may be recorded for future use, such as to improve quality or determine if something went wrong during the conversation. Often, the audio of the conversations is transcribed to text so text searches may be performed.

However, some contact centers may record thousands of conversations a day, so trying to perform searches on the conversations is tedious and time-consuming. Further, finding the right conversations may be difficult since straight text searches may not be useful to find an item, such as did the customer became unhappy during the conversation.

Some companies have reviewers that spend time listening to the conversations, but this process is expensive, prone to errors, and typically limited to a small subset of all the available conversations.

What is needed are flexible search engines that can perform searches based on the content of the conversation.

SUMMARY

A versatile and powerful search application for conversations logs is provided, including options to search straight text in the conversation, states of the conversation, information given during a given state, and relationships among the states or the parameter values embedded within the states.

The search application, referred to herein also as transition-driven search, is part of an Engagement Intelligence Platform (EIP), which is a system that facilitates the easy and automatic analysis of conversations for customer interactions. The EIP enables companies and developers to unlock the untapped troves of customer insight, compliance violations, and coaching opportunities that exist in every conversation.

The EIP analyzes transcripts of conversations to find different states and information associated with each of the states (e.g., interest rate quoted in the value of the interest rate). With transition-driven search, instead of searching for a word or a text string, the system enables search parameters associated with the states of the conversation and linkages between the states (e.g., asked if a user smokes, respond as yes, no, maybe).

The user may perform queries, such as, "Find all calls were the agent asked the customer for their name and the customer did not answer;" "Find all calls where the customer objected after the interest rate for the loan was quoted," "Find me calls where the agent asked for consent for recording the call, but no customer confirmation was received." Other solutions analyze interactions between a human and a machine, but EIP goes beyond and analyzes interactions between two humans.

BRIEF DESCRIPTION OF THE DRAWINGS

Various of the appended drawings merely illustrate example embodiments of the present disclosure and cannot be considered as limiting its scope.

FIG. 3 is a sample flow diagram showing the use of different tools for conversation analysis and review, according to some example embodiments.

FIG. 4 is an image of a user interface (UI) that includes options for tagging sections of the conversation, according to some example embodiments.

FIG. 5 is an image showing how to attack a name embedded in the conversation utilizing a pull-down menu with options for the configured tags, according to some example embodiments.

FIG. 6 is an image showing the use of the option for configuring the call sentiment of the conversation, according to some example embodiments.

FIG. 7 is an image showing the user interface with color-coded tags for easy review, according to some example embodiments.

FIG. 10 is an image of a user interface for flexible and versatile conversation searches, according to some example embodiments.

DETAILED DESCRIPTION

Example methods, systems, and computer programs are directed to a flexible search tool for searching audio conversations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Methods, systems, and computer programs are presented for searching the content of voice conversations. The conversations are translated into text and analysis of the conversation is performed to identify information in the conversation. The information identified includes turns taking data in the conversation and states identified within each state. A powerful user interface (UI) is provided to review the conversations and add annotations that tag the different turns. Additionally, parameter values are extracted from the text. A powerful search engine is provided with multiple search options, such as searching for text, searching by state within the conversation, searching by parameters extracted from the conversation, or a combination thereof.

One general aspect includes a method that includes an operation for identifying a plurality of transcripts, each transcript comprising transcript data, the transcript data comprising transcript text, and one or more identified states within the transcript, each state being associated with a state tag, a location within the transcript text, and a state parameter extracted from the transcript. The method further includes an operation for providing a user interface (UI) for searching the plurality of transcripts, the UI including search options for selecting one or more state tags and for selecting conditions for values of the state parameter of the selected tags. A search is performed based on values for the search options received in the UI, and the results of the search are presented on the UI.

Figure 1:
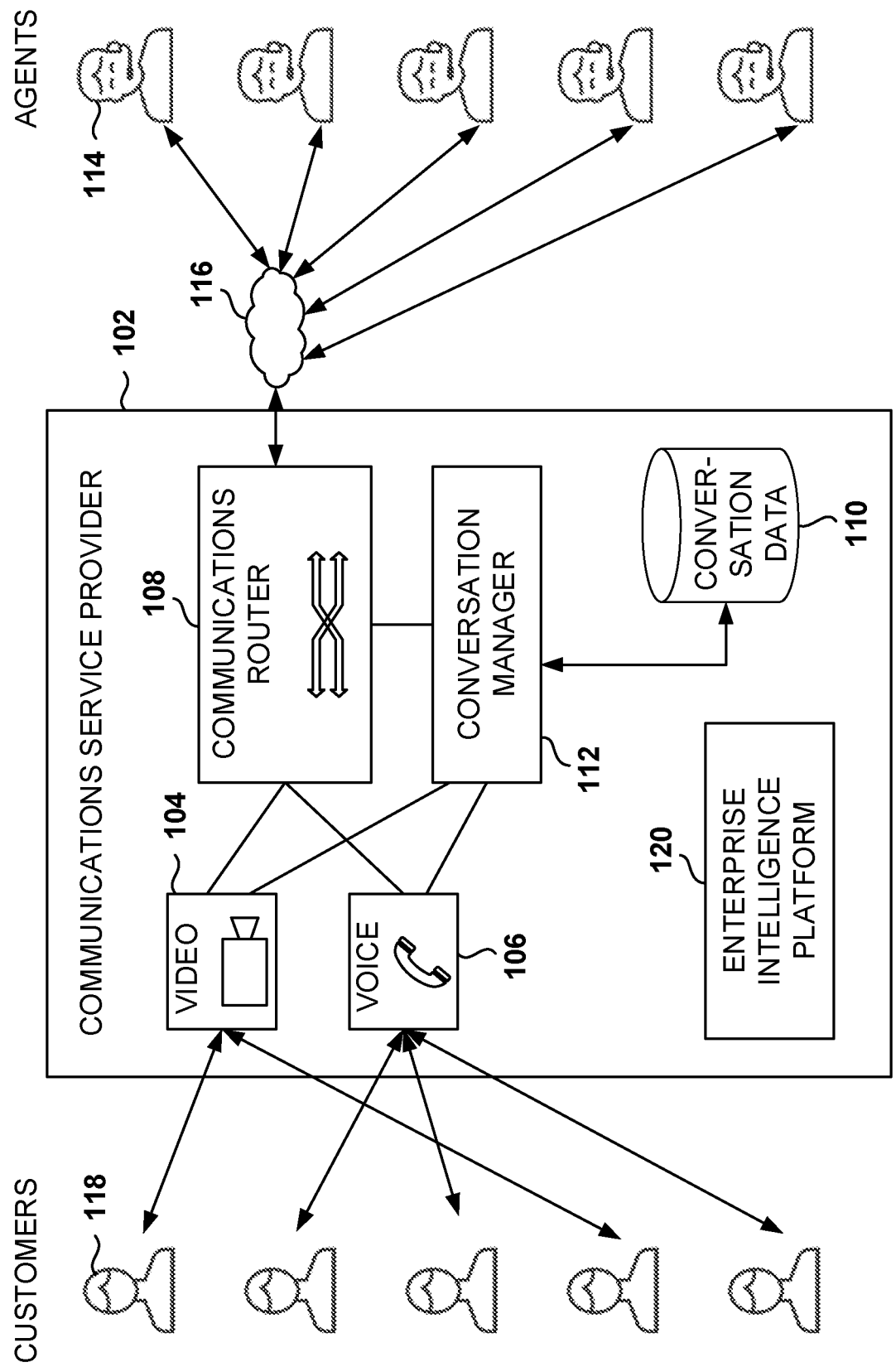
FIG. 1 is a representative diagram showing an architecture of a communications service provider that provides call center services, according to some example embodiments.

FIG. 1 shows an architecture of a communications service provider that provides contact center services, according to some example embodiments. In some example embodiments, a communications service provider 102 provides call-center services to facilitate voice and data communications between customers 118 and agents 114.

The agents 114 may work for a plurality of companies that use the services of the communications service provider 102. The customers 118 may establish video and voice conversations to communicate with the agents 114, such as for requesting support for a product of service.

The customers 118 and agents 114 communicate with the communications service provider 102 via direct connections or through a network 116, such as the Internet or a private network connection.

When a customer 118 requests a video or voice communication with the company, the communications service provider 102 routes the video or voice communications to one of the agents 114 from that company. When an agent 114 initiates the call, the conversation manager 112 routes the call to the customer 118.

During the conversation, a conversation manager 112 records the conversations (e.g., voice data) in a conversations database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and terminate conversations, as well as managing the storage of conversation data when requested by the client.

The clients may use the conversation data to manage, monitor, and improve operations, such as to monitor for compliance by an agent or to determine when a follow up call is requested to further a sales process.

The Enterprise Intelligence Platform (VIP) 120 is a program that analyzes spoken and written customer interactions and provides programmable customization tools for customers to tag, edit, analyze, and search the data from the spoken and written customer interactions.

Figure 2:
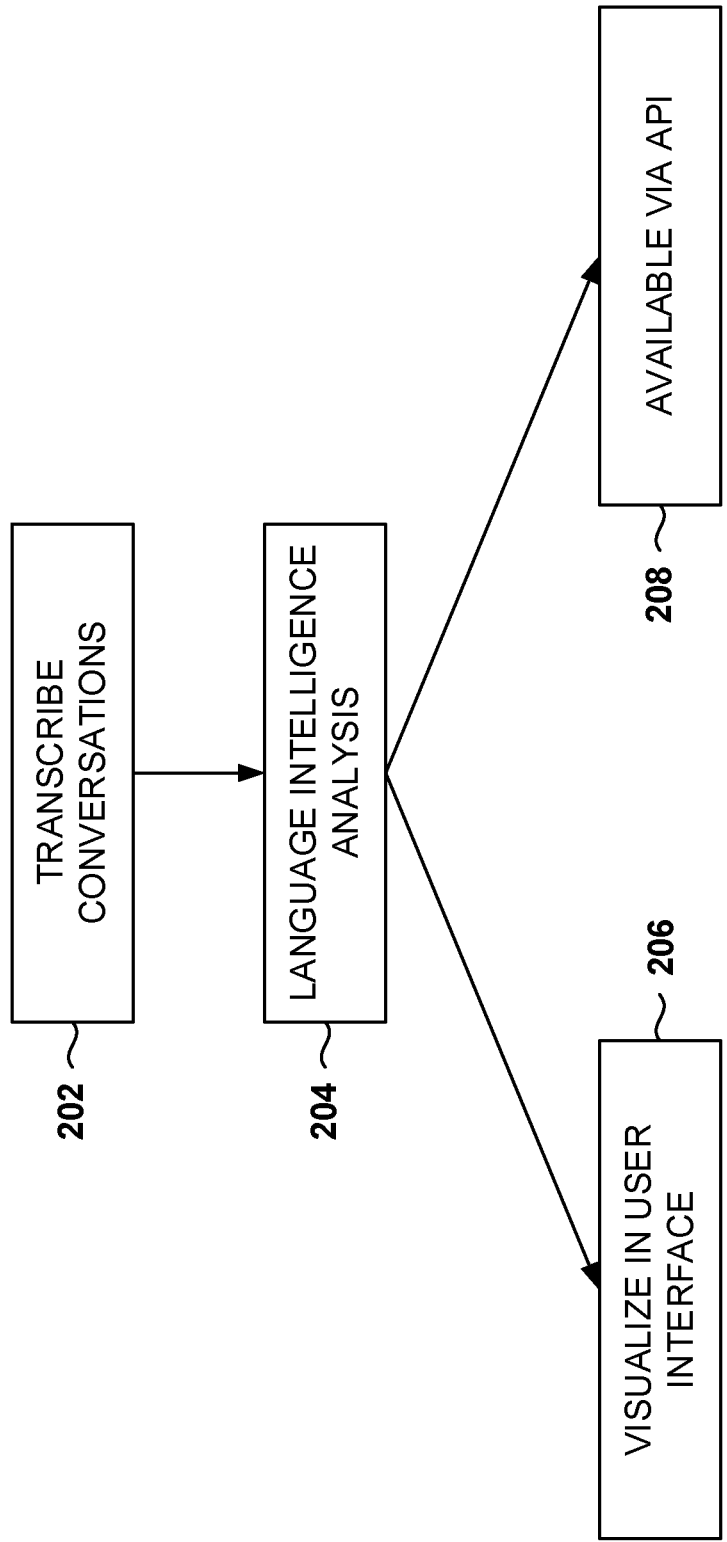
FIG. 2 is a flow diagram showing, at a high level, the conversation tools available for search and review, according to some example embodiments.

FIG. 2 shows, at a high level, the conversation tools available for search and review, according to some example embodiments. The EIP 120 includes tools for transcribing conversations 202, analyzing language within the conversations 204, and visualizing 206 the results from the analysis in the user interface. The EIP 120 also provides tools for search, and for accessing the conversation data via an Application Programming Interface (API) 208.

In some example embodiments, the EIP analyzes the conversation data offline; that is, the EIP is not active in trying to guide the conversation, although, in some example embodiments, the EIP may also analyze data real-time to provide real-time information.

Transition-driven search refers to the ability to search conversation data based on the natural turns in the conversation between the two participants and based on an analysis of the content within each turn and how multiple turns relate to each other, such as when multiple turns refer to the same topic (e.g., agent providing their name to the caller).

With transition-driven search, the customer is able to filter based on how the conversational turns change throughout the conversation. Here are a few examples:

Find all calls where the agent asked the customer for their name and the customer did not answer;

Find all calls where the customer objected after the interest rate for the loan was quoted; and Find all calls where the agent asked for consent for recording the call, but no customer confirmation was received.

As these examples show, EIP provides great flexibility for searching through thousands of conversations to find events that would be almost impossible to find through standard text searches, or it would require a large amount of time to scan through all the conversations.

FIG. 3 is a sample flow showing the use of different tools for conversation analysis and review, according to some example embodiments. While the various operations in this flowchart are presented and described sequentially, one of ordinary skill will appreciate that some or all of the operations may be executed in a different order, be combined or omitted, or be executed in parallel.

At operation 302, the audio of the conversation is captured, and at operation 304, natural language processing (NLP) is used to analyze the audio of the conversation to generate the raw text 306. The raw text 306 is a list of words identified in the conversation, without including commas, periods, or any other punctuation marks that help identify sentences within the conversation.

The formatter 308 takes the raw text 306 and formats the text into plain English sentences, such as by dividing the raw text 306 into sentences, adding periods and commas, capitalizing beginning of sentences and proper names, etc. The result is that formatted text 310.

After the formatted text 310 is available, the turns in the conversation are identified at operation 312, where each turn represents the words spoken by one of the parties without interruption by the other party.

Identifying turns (e.g., identifying a question and a corresponding answer) is not a simple proposition because it involves more than just identifying two turns within the conversation. Sometimes, it may take several turns to ask a question and get an answer. For example, there are several types of questions that causes some people to be reluctant to respond, and it might take several turns of reinstating the question to get a clear answer, such as asking if the caller is a smoker.

Further, the exact words used to ask the question do not matter, as long as the question is asked. Therefore, the ML model may have to be able to identify multiple ways of asking the same question as a simple text search may fail.

At operation 314, the EIP identifies states within the conversation, where each state refers to a segment of the conversation associated with a single topic (e.g., providing the name of the party, quoting a price for a good, obtaining contact information, etc.). A state may include one or more turns, because a participant may require multiple turns to provide certain information (e.g., one turn providing name as "John," agent asking for full name, customer providing "John Doe").

Further, at operation 316, one or more of the identified states are analyzed to extract a parameter value. For example, for a state where a name is provided, the name is extracted; for a phone-number state, the phone number is extracted; for a quote of an interest rate, the interest rate is extracted; for a state where the client identifies if the client is a smoker, smoker or no smoker is extracted, etc. In same example embodiments, an ML model is used to extract the parameters.

At operation 318, the conversation is classified according to one from a plurality of possible classification values. For example, the classification values may include a positive outcome, a neutral outcome, or a negative outcome. In another example, the classification values may include a sale was made or a sale was not made.

At operation 320, a summary of the conversation is created. In some example embodiments, the salary is a textual abstract of the content of the conversation. In some example embodiments, the summary is generated by an ML model.

At operation 322, a user interface is provided to the user, where the user interface includes multiple options for examining conversations, including reading and listening to the conversations 324 and performing searches 326. The user interface provides an option to annotate 328 the conversation, such as to edit the suggestions generated by the AI models, edit the transcript suggested by the NLP, tag the states, and validate values of identified parameters.

The search 326 may be of different kinds, such as word matching (e.g., word search), search by state type (e.g., agent identified herself), or by parameter value (e.g., caller lives in California), or a combination thereof.

FIG. 4 is a UI 400 that includes examples of options for tagging sections of the conversation, according to some example embodiments. The UI 400 presents the transcript of the conversation for efficiently listening and reviewing conversations, seeing related annotations, which may be generated by a user or the ML model, and providing the ability to tag the conversation.

Tagging, referred to herein as annotating, includes identifying states or parameters within the conversation, such as a user name. In some example embodiments, the user is able to create custom annotations, such as annotations indicative of an agent name, a statement that the conversation is recorded, a use of profanity, etc. Once the custom annotations are created, the user is able to quickly select a piece of text and then associate the selected text with one of the annotations.

In some example embodiments, the complexity of analyzing conversations is greatly reduced by limiting the analysis to identify those annotations created by the client. Instead of having to analyze millions of possible annotations in an open-ended conversation, the system only has to identify from a plurality of possible annotations. This reduction of complexity may be very useful as, for example, conversations in a support center tend to be very similar and deal with a limited set of possible items. Further, the user may also be concerned with certain parameters and not everything that was said. For example, beginning casual conversation talking about the weather may be of little interest for analyzing the content of the conversation.

However, some of the annotations may be common for multiple users, or for users within the same industry, and the EIP system provides a dictionary of common annotations to let the user select from the dictionary to be able to build up the custom EIP solution.

FIG. 5 shows how to attach a name embedded in the conversation to an annotation utilizing a pull-down menu with options for the configured tags, according to some example embodiments. Annotating an entry is easy in user interface 400. The user selects a piece of text (one or more words) and then right clicks on the selection. Menu 502 then appears with a list of the predefined annotations.

If the user selects one of the annotation options, then the selected test is associated with the annotation. In the illustrated example of FIG. 5, the user has selected the word "Brittney." After the right click, the options are presented, and the user may select the annotation NameAgent associated with the state where the agent provides their name.

In some example embodiments, an option is provided to add a new annotation, and the user may associate the selected test with a newly created annotation.

FIG. 6 shows the use of the option for configuring the call sentiment of the conversation, according to some example embodiments. The UI 400 includes an option 602 for the user to categorize the overall conversation. In the illustrated example, the categorization option is referred to as "call sentiment," with the possible values of "positive," "neutral," and "negative."

The user has the option to categorize the whole conversation by selecting one of the values. In some example embodiments, the possible values are configurable by the user. For example, the user is able to specify a list the desired possible categories. In some example embodiments, an ML model analyzes the conversation and provides an initial value for the call sentiment, which may be overridden by the user.

FIG. 7 shows a UI 700 with color-coded tags for easy review, according to some example embodiments. In UI 700, each annotation is of a different color, as illustrated on the list of annotations provided on the left of the UI 700. The identified annotations are then presented in color within the conversation text, for faster and easier tracking and searching of the annotations.

Figure 8:
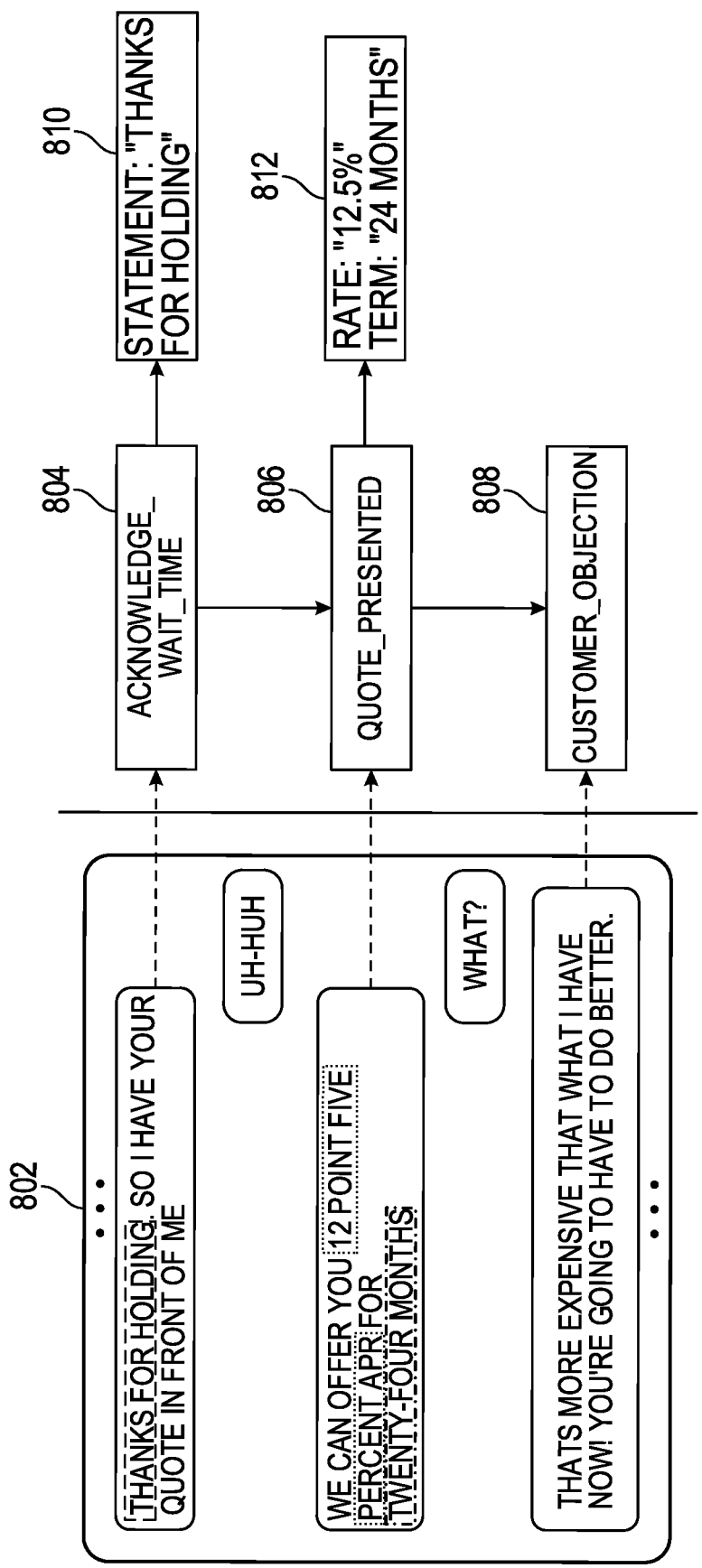
FIG. 8 is a diagram illustrating the detection of states and the extraction of parameter values within the state, according to some example embodiments.

FIG. 8 illustrates the detection of states and the extraction of parameter values within the states, according to some example embodiments. In the illustrated example, a portion of the conversation is presented in window 802.

The first turn in the conversation includes a message, "Thanks for holding, so I have your quote in front of me." This turn is associated with the state 804 ACKNOWL- EDGE_WAIT_TIME for acknowledging the wait time. Further, the parameter 810 value "Thanks for holding" is extracted.

In the next turn, the text includes, "We can offer you 12 point five percent APR for twenty-four months," and the corresponding state 806 is for presenting the quote QUOTE_PRESENTED. Associated with state 806 are the parameter values 812 for rate as 12.5% and for term as 24 months.

The next turn includes the utterance "What," which is not associated with any annotated state. The next line reads, "That's more expensive than what I have now! You're going to have to do better." This line is associated with the state 808 for a customer objection CUSTOMER_OBJECTION.

By identifying the states and extracted parameters, the search within conversations is much easier and provides abilities that would be almost impossible with simple text searching.

In some example embodiments, this process is referred to as the classify-extract flow. A classify-extract flow includes a classify step, where a machine learning model identifies what sentences to analyze, and an extract step, which finds the span or spans of interest within the identified sentences. A benefit of the classify-extract flow as a model framework is that it is generic enough to satisfy a whole realm of desired ML surface areas to turn unstructured utterances into structured and extracted data.

Figure 9:
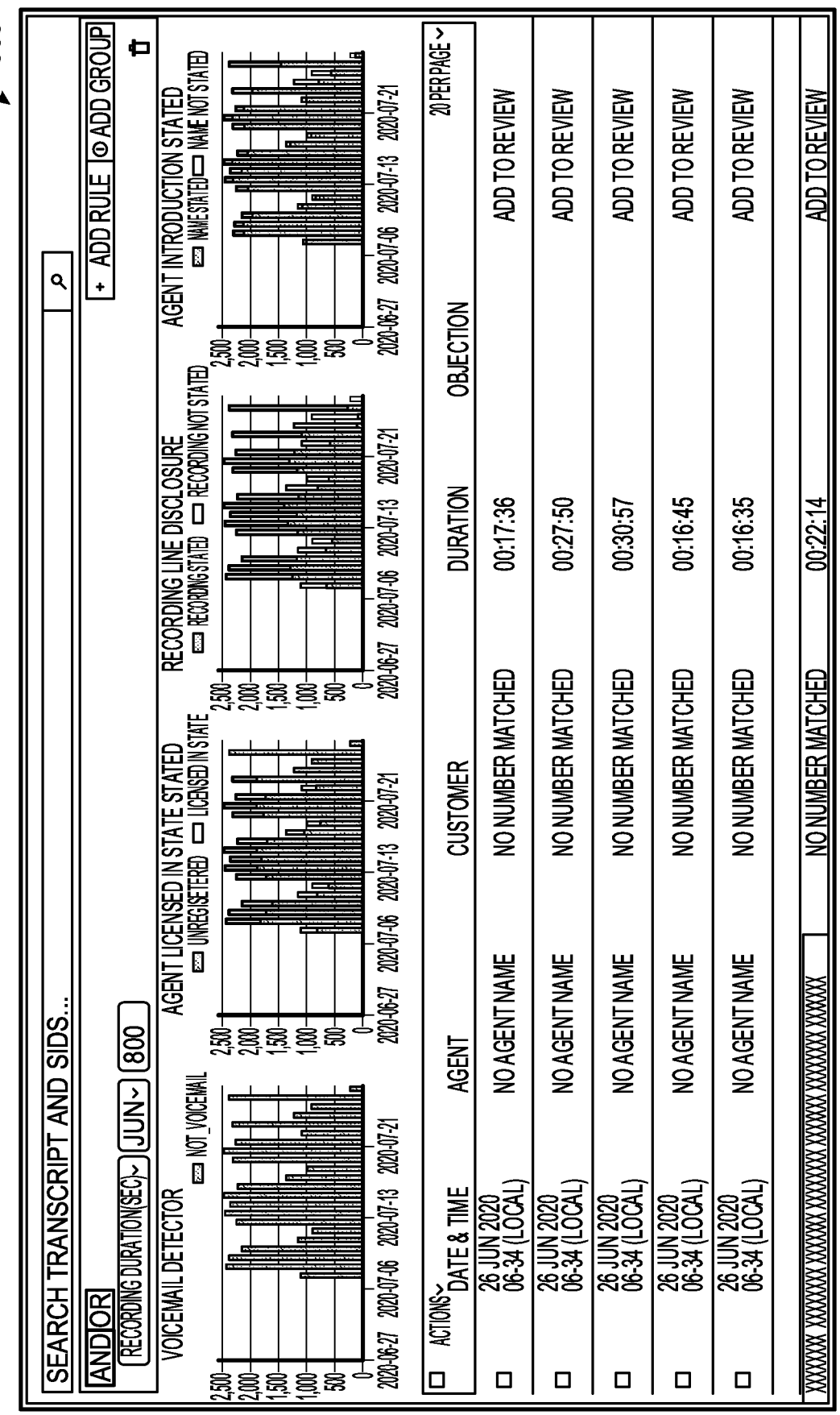
FIG. 9 is an image of a user interface with statistical analysis of conversations based on the identified tags, according to some example embodiments.

FIG. 9 is a UI 900 with statistical analysis of conversations based on the identified tags, according to some example embodiments. In some example embodiments, the statistical analysis is performed by annotation category. For each annotation, a histogram is presented providing the member with access to conversations for a particular date. In some example embodiments, the histogram bar is broken into segments based on the number of values extracted from each conversation. For example, the histogram may include a bottom section of the first color for the number of times where an event occurred (e.g., agent introduced herself) and a top section for the number of times where the event did not occur (e.g., agent did not introduce herself).

The illustrated embodiment shows the use of histogram, but other types of charts may also be used, such as line charts, pie charts, or combinations of histogram, line, and pie charts, etc. The charts provide a visualization of trends within the conversation data.

A table below the charts shows a line for each of the conversations resulting from a particular search. If the user selects one of the lines, the conversation is presented, such as in the UI 400 of FIG. 4.

FIG. 10 is a UI 1000 for flexible and versatile conversation searches, according to some example embodiments. The search options include search text, search by state (e.g., time when customer gave their name), search by extracted parameter value (e.g., quoted price of goods), or any combination thereof.

Additionally, multiple search parameters may be combined using logical operators, such as AND and OR, and comparison operators with reference to parameter values, such as "equal to," "greater than," "greater than or equal," "less than," "less than or equal," etc.

For example, the user may search for calls that lasted more than 800 seconds, an annotation indicating that the agent introduced herself and the name was provided, and an annotation indicating that the agent informed the customer that the call was being recorded.

The UI 1000 provides the ability to add more conditions and link them with AND or "OR," and then enter comparison operators for each annotation, such as the duration of the call, a Boolean value indicating that the name was provided, etc.

Because the conversations have been analyzed to annotate the different states, the search engine provides these powerful capabilities to perform searches based on meaningful events that occur throughout the conversation.

Once the search is submitted by the use in the UI 1000, the EIP system converts the entered parameter and performs the query. In some cases, the query to the database may be broken into multiple searches and then the results are combined.

In other example embodiments, all the conditions established in the search may be converted into a single search query that searches the conversation, such as by searching the metadata associated with each conversation, where the metadata includes data associated with the conversation, such as duration, timestamp, names of the parties, identified annotations, identified parameters, etc.

Figure 11:
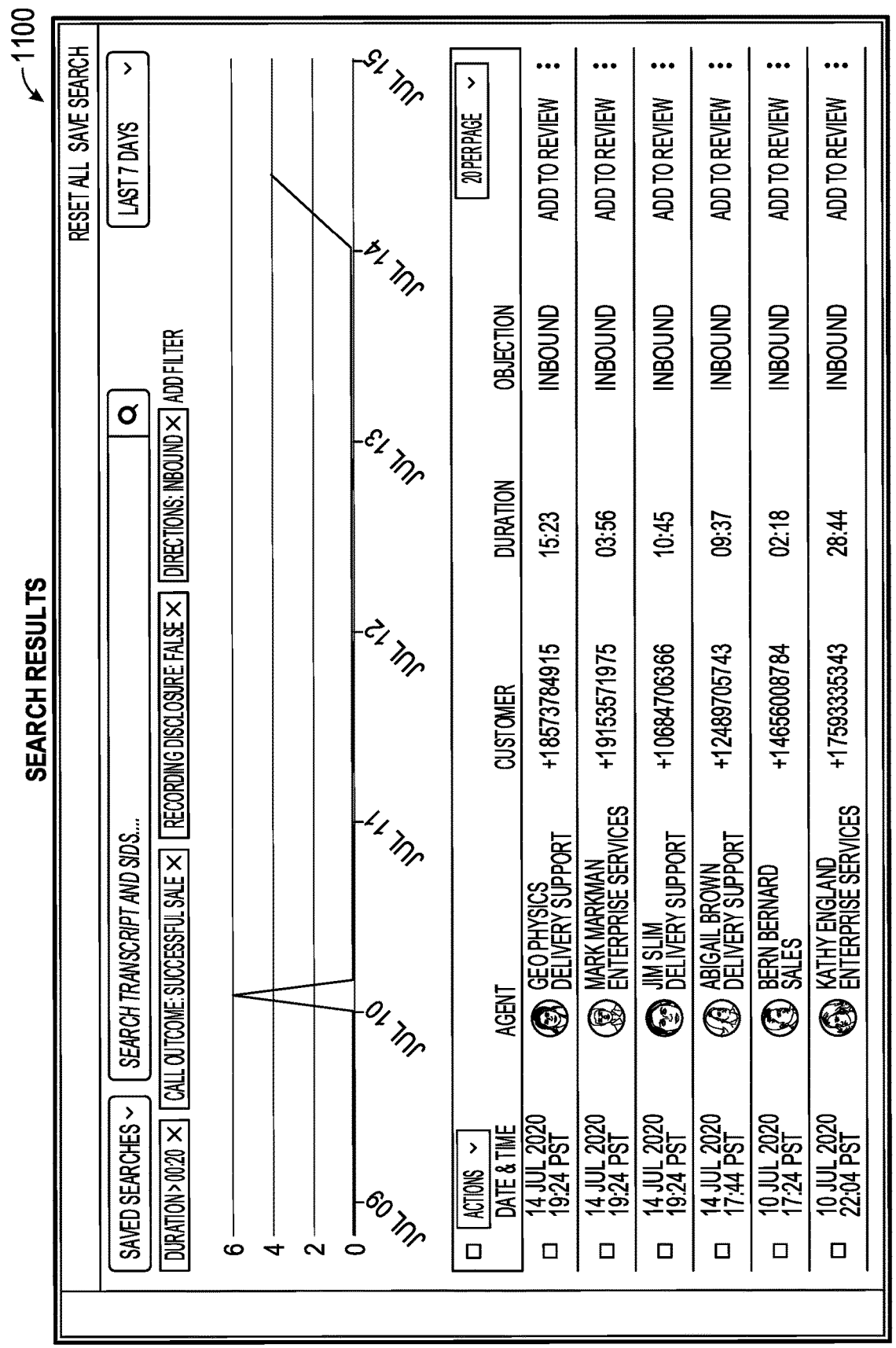
FIG. 11 is an image of a sample user interface showing the results of the search.

FIG. 11 is an image of a sample user interface showing the results of the search. After the search is completed, the results are presented to the user, such as in the UI 1100. The UI 1100 presents the result in a table, where each row corresponds to one conversation that meets the search criteria. The results may be ordered by timestamp or by some other field. In some example embodiments, a chart at the top shows the incidence of the results within a time scale.

Figure 12:
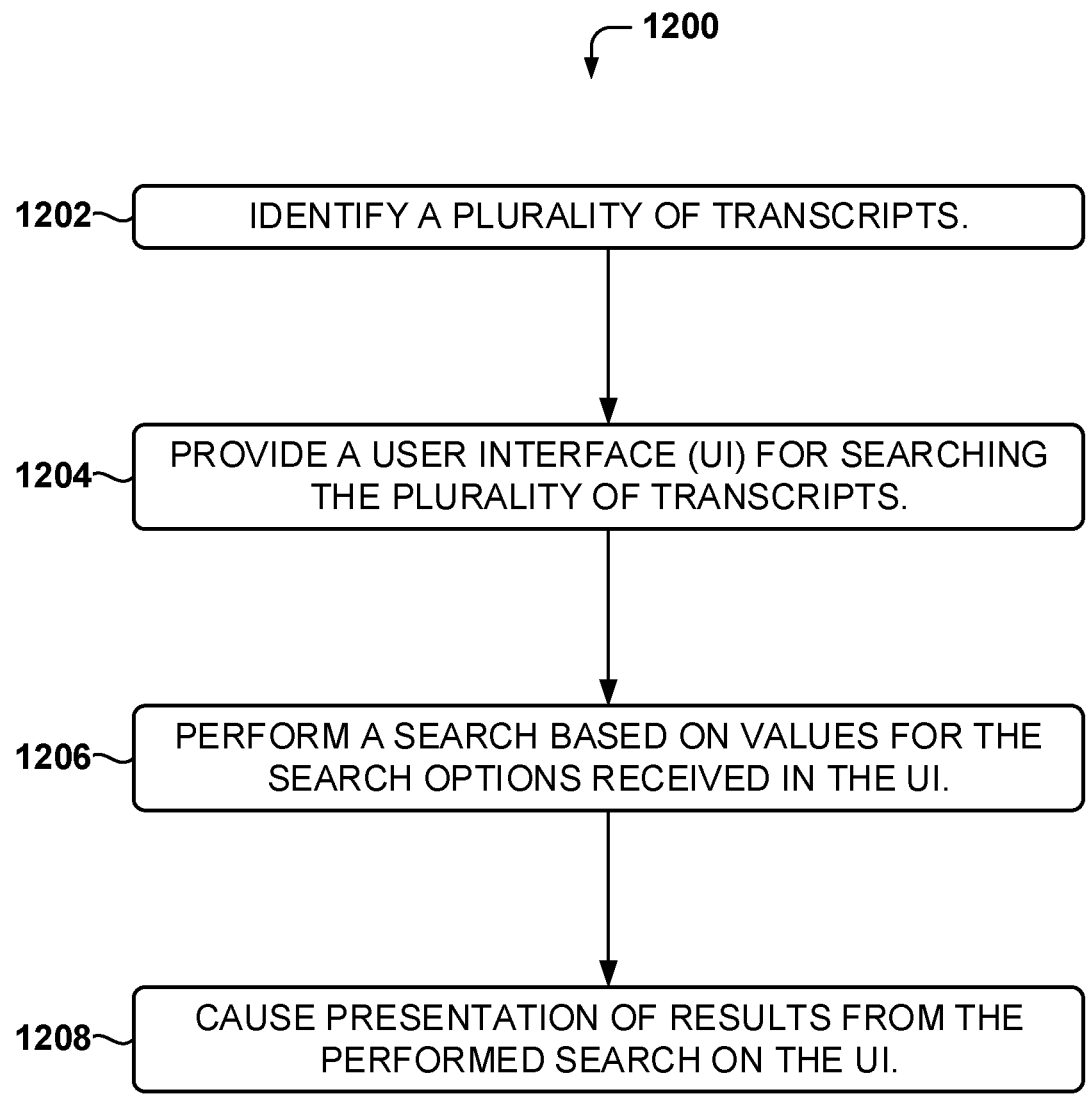
FIG. 12 is a flowchart of a method for flexible and versatile conversation searches, according to some example embodiments.

FIG. 12 is a flowchart of a method 1200 for flexible and versatile conversation searches, according to some example embodiments. While the various operations in this flowchart are presented and described sequentially, on of ordinary skill will appreciate that some or all of the operations may be executed in a different order, be combined or omitted, or be executed in parallel.

At operation 1202, the method identifies a plurality of transcripts. Each transcript comprises transcript data, and the transcript data comprises transcript text and one or more identified states within the transcript, each state being associated with a state tag, a location within the transcript text, and a state parameter extracted from the transcript.

From operation 1202, the method 1200 flows to operation 1204 for providing a UI for searching the plurality of transcripts. The UI includes search options for selecting one or more state tags and for selecting conditions for values of the state parameter of the selected tags.

From operation 1204, the method flows to operation 1206 where a search is performed based on the values for the search options received in the UI.

At operation 1208, the method causes presentation of results from the performed search on the UI.

In one example, the method 1200 further comprises identifying, by a machine-learning (ML) model, the states in a first transcript from the plurality of transcripts, the ML model having been trained with data from a training set that comprises training transcripts with identified states within the training transcripts.

In one example, features of the ML model include one or more of turns within the transcript, states within the transcript, and values of the state parameters.

In one example, performing the search further comprises converting a single search query into multiple searches, and combining results of the multiple searches into one output.

In one example, the search options include a first value for a first state tag, wherein performing the search further comprises identifying transcripts that include the first value for the first state tag in the transcript.

In one example, the method 1200 further comprises identifying turns within the transcript.

In one example, the search options for at least two of the one or more state tags are combined using an AND comparison operator or an OR comparison operator.

In one example, the search options comprise an option to include or exclude a transcript having a specified value for a second state tag.

In one example, the method 1200 further comprises creating the transcript data, the creating the transcript data comprising obtaining recordings of audio conversations, performing natural language processing on the recordings to generate raw text, the raw text including text without punctuation marks and without proper capitalization, and formatting, by an annotator ML model, the raw text of the audio conversations to generate formatted text.

In one example, the search options include an option to select metadata associated with the transcripts, the metadata comprising one or more of duration, names of parties, and identified state parameters.

Another general aspect is for a system that includes a memory comprising instructions and one or more computer processors. The instructions, when executed by the one or more computer processors, cause the one or more computer processors to perform operations comprising: identify a plurality of transcripts, each transcript comprising transcript data, the transcript data comprising transcript text, and one or more identified states within the transcript, each state being associated with a state tag, a location within the transcript text, and a state parameter extracted from the transcript; provide a user interface (UI) for searching the plurality of transcripts, the UI including search options for selecting one or more state tags and for selecting conditions for values of the state parameter of the selected tags; perform a search based on values for the search options received in the UI; and cause presentation of results from the performed search on the UI.

In yet another general aspect, a machine-readable storage medium (e.g., a non-transitory storage medium) includes instructions that, when executed by a machine, cause the machine to perform operations comprising: identify a plurality of transcripts, each transcript comprising transcript data, the transcript data comprising transcript text, and one or more identified states within the transcript, each state being associated with a state tag, a location within the transcript text, and a state parameter extracted from the transcript; provide a user interface (UI) for searching the plurality of transcripts, the UI including search options for selecting one or more state tags and for selecting conditions for values of the state parameter of the selected tags; perform a search based on values for the search options received in the UI; and cause presentation of results from the performed search on the UI.

Figure 13:
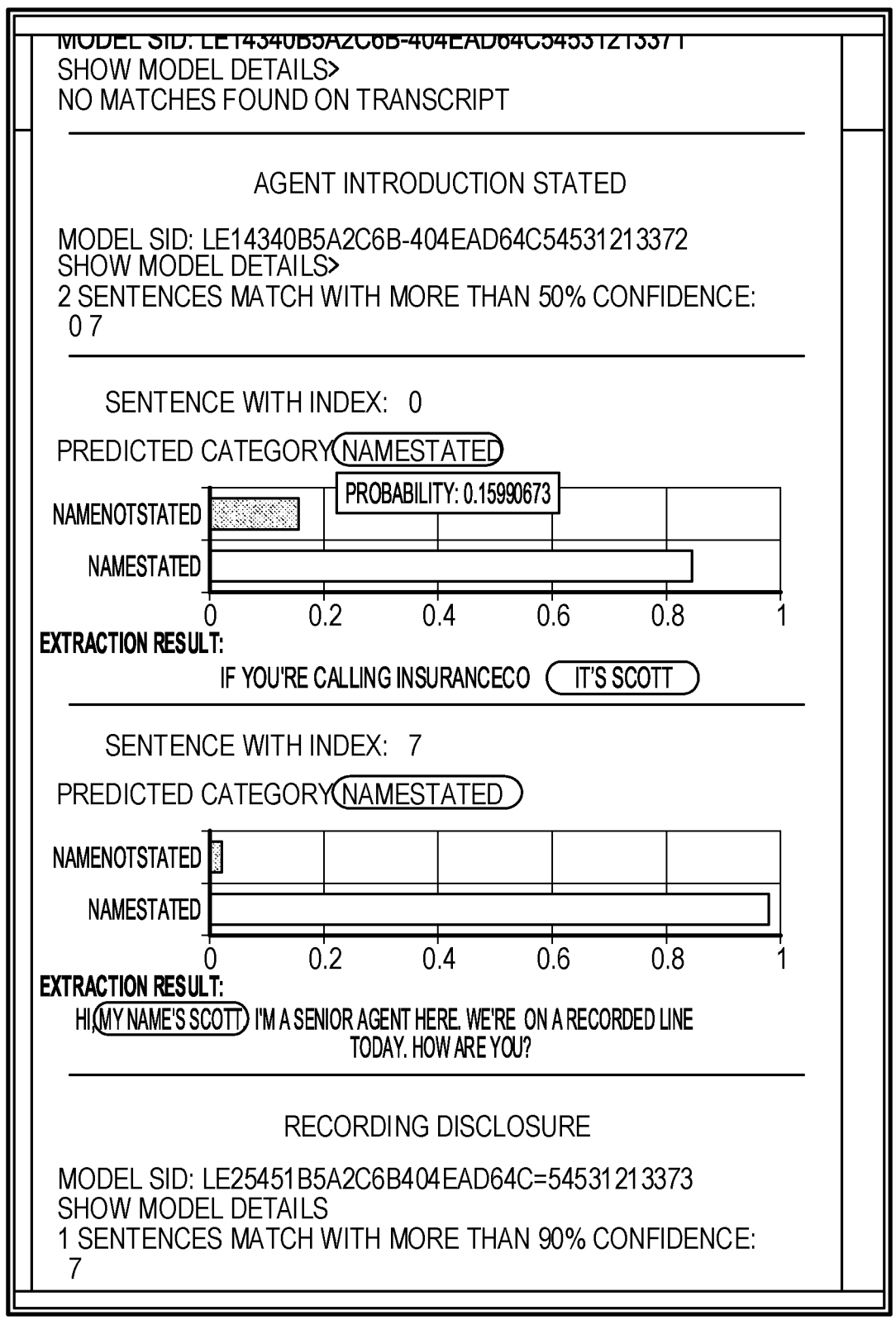
FIG. 13 is a sample page for a particular state, according to some example embodiments.

FIG. 13 is a sample page 1300 for a particular state, according to some example embodiments. In this example, two separate turns have been identified in a search for an agent providing the name to the customer.

The sample page 1300 provides particular details about the annotation, including metadata. For each annotation, the page 1300 shows a histogram with probabilities for the given annotation. In this example, the probabilities include the probability that the agent did not state their name and the probability that the agent provided their name.

Below the chart, the relevant turn is presented, with the annotation example. In this case, for the top result, the words "this is Scott" are highlighted to show that the agent provide their name.

Similarly, in the bottom result, the words "My name's Scott" are identified as the corresponding annotation for the sate about the agent stating an introduction.

Figure 14:
FIG. 14 is a flow chart illustrating five of the primitives used to understand conversations, according to some example embodiments.

FIG. 14 illustrates five of the primitives used to understand conversations, according to some example embodiments. As used herein, primitives refer to programs offering respective functionality with regards to conversation analysis.

In some example embodiments, the primitives include spot, extract, classify, and summarize. The spot primitive detects whether something was said in the conversation, such as finding particular words of interest. The extract primitive extracts information from the conversation, such as a parameter value, one or more words, or the answer to a question.

The classify primitive classifies a conversation to find the turns within the conversation. The redact primitive finds and redacts a parameter value mentioned in the conversation. Further, the summarize primitive provides a summary of the key points from the conversation, such as an abstract of a text document.

The different primitives may be combined to perform the conversation analysis, such as using the classify primitive to find annotations within the conversation and the extract primitive to find parameter values within the identified annotations.

In some example embodiments, multiple machine-learning models may be defined to implement the primitives. For example, one ML model may be used to identify the terms within the conversation, and once a particular annotation is provided (e.g., name stated), a model is used to find the name in the turn.

In some example embodiments, a Q&A primitive is used for finding turns in a conversation that include a question and a corresponding answer. It is noted that it may take multiple turns in the conversation to state a question or to obtain the answer; therefore, the Q&A primitive may look beyond simply observing pairs of turns for questions and answers.

Figure 15:
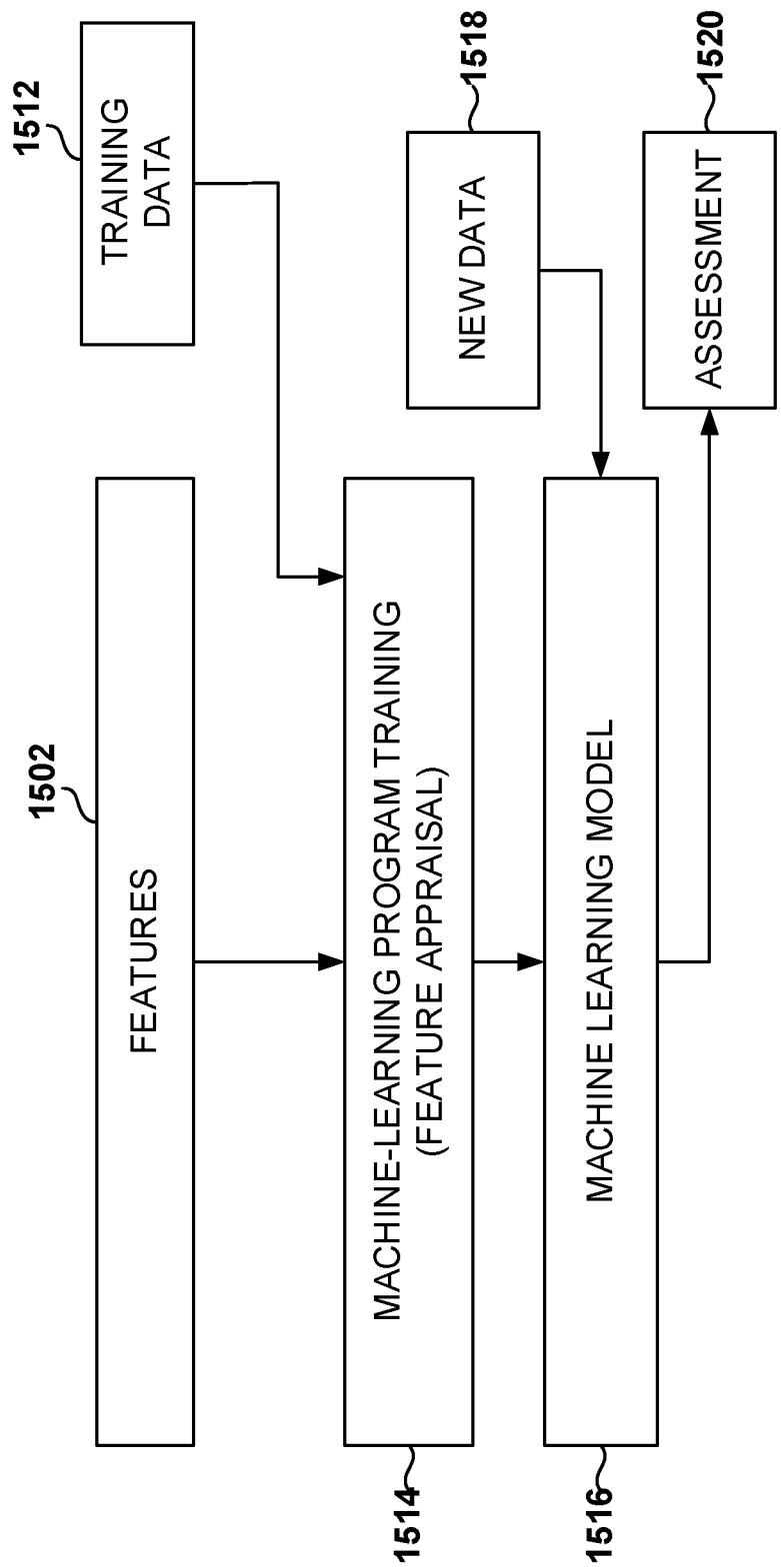
FIG. 15 is a flow chart illustrating the training and use of a machine-learning program, according to some example embodiments.

FIG. 15 illustrates the training and use of a machine-learning program, according to some example embodiments. In some example embodiments, machine-learning programs (MLPs), also referred to as machine-learning algorithms or tools, are utilized to perform operations associated with generation of text summaries for text documents.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data 1518. Such machine-learning algorithms operate by building an ML model 1516 from example training data 1512 in order to make data-driven predictions or decisions expressed as outputs or assessments 1520. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Some common tasks for unsupervised ML include clustering, representation learning, and density estimation. Some examples of commonly used unsupervised-ML algorithms are K-means clustering, principal component analysis, and autoencoders.

In some embodiments, the ML model 1516 is used to perform analysis of a conversation. For example, the five primitives illustrated in FIG. 14 may be implemented as ML models.

The training data 1512 comprises examples of values for the features 1502. In some example embodiments, the training data comprises labeled data with examples of values for the features 1002 and labels indicating the outcome, such as summaries of conversations, parameters extracted, turns identified, places where a name was found, etc. The machine-learning algorithms utilize the training data 1512 to find correlations among identified features 1502 that affect the outcome. A feature 1502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs. In one example embodiment, the features 1502 may be of different types and may include words used in the conversations.

During training 1514, the ML algorithm analyzes the training data 1512 based on identified features 1502 defined for the training. The result of the training 1514 is an ML model 1516 that is capable of taking inputs to produce assessments. In some example embodiments, the inputs include a transcript of a conversation, and the output is an identified state, a parameter extracted, an annotation in the text, etc.

Training the ML algorithm involves analyzing large amounts of data (e.g., from several gigabytes to a terabyte or more) in order to find data correlations. The ML algorithms utilize the training data 1512 to find correlations among the identified features 1502 that affect the outcome or assessment 1520. In some example embodiments, the training data 1512 includes labeled data, which is known data for one or more identified features 1502 and one or more outcomes, such as the summaries generated.

The ML algorithms usually explore many possible functions and parameters before finding what the ML algorithms identify to be the best correlations within the data; therefore, training may make use of large amounts of computing resources and time.

Figure 16:
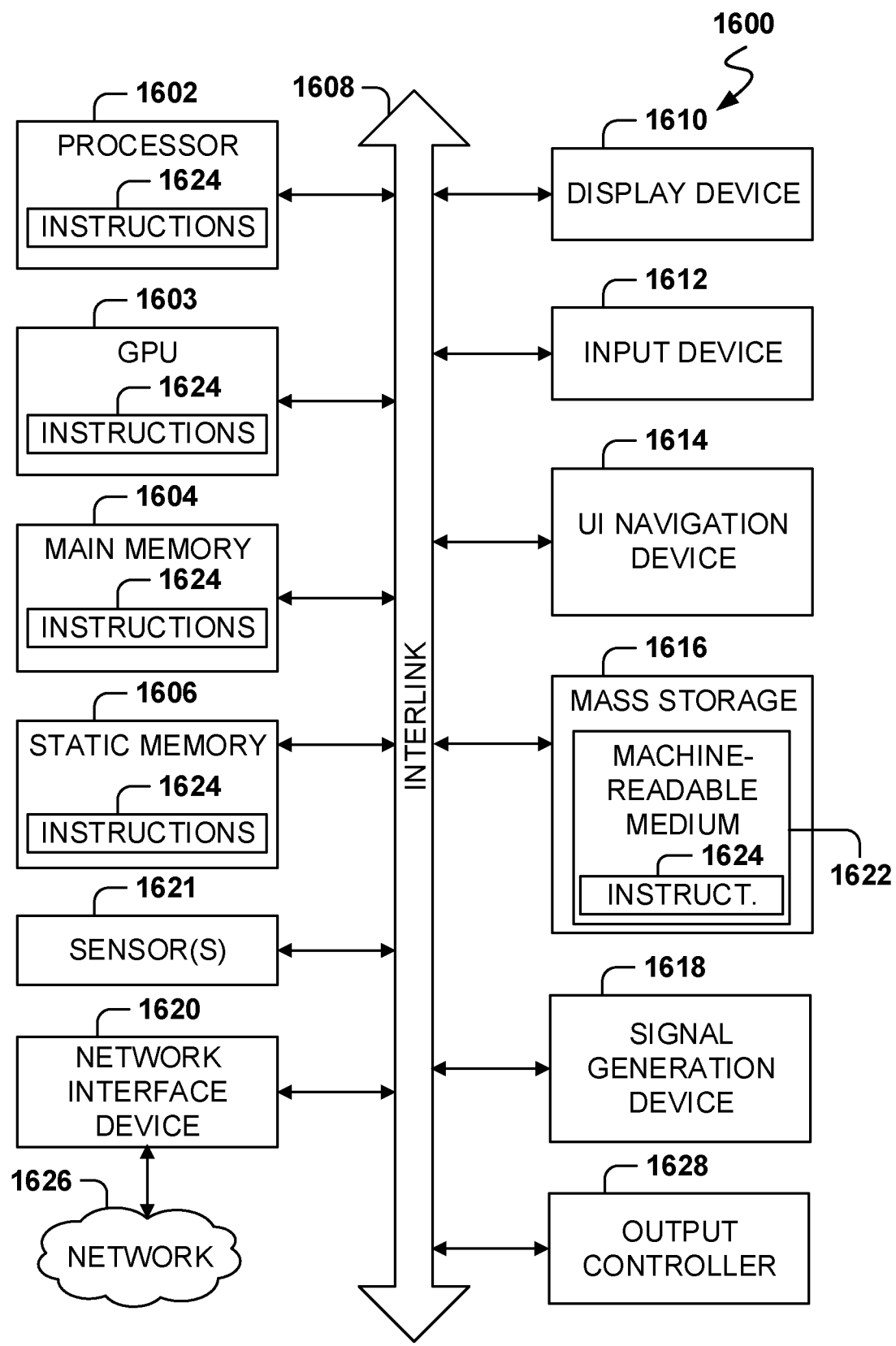
FIG. 16 is a block diagram illustrating an example of a machine upon or by which one or more example process embodiments described herein may be implemented or controlled.

FIG. 16 is a block diagram illustrating an example of a machine 1600 upon or by which one or more example process embodiments described herein may be implemented or controlled. In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in a peer-to-peer (P2P) (or other distributed) network environment. Further, while only a single machine 1600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1600 may include a hardware processor 1602 (e.g., a central processing unit (CPU), a hardware processor core, or any combination thereof), a graphics processing unit (GPU) 1603, a main memory 1604, and a static memory 1606, some or all of which may communicate with each other via an interlink (e.g., bus) 1608. The machine 1600 may further include a display device 1610, an alphanumeric input device 1612 (e.g., a keyboard), and a user interface (UI) navigation device 1614 (e.g., a mouse). In an example, the display device 1610, alphanumeric input device 1612, and UI navigation device 1614 may be a touch screen display. The machine 1600 may additionally include a mass storage device (e.g., drive unit) 1616, a signal generation device 1618 (e.g., a speaker), a network interface device 1620, and one or more sensors 1621, such as a Global Positioning System (GPS) sensor, compass, accelerometer, or another sensor. The machine 1600 may include an output controller 1628, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1616 may include a machine-readable medium 1622 on which is stored one or more sets of data structures or instructions 1624 (e.g., software)

embodying or utilized by any one or more of the techniques or functions described herein. The instructions 1624 may also reside, completely or at least partially, within the main memory 1604, within the static memory 1606, within the hardware processor 1602, or within the GPU 1603 during execution thereof by the machine 1600. In an example, one or any combination of the hardware processor 1602, the GPU 1603, the main memory 1604, the static memory 1606, or the mass storage device 1616 may constitute machine-readable media.

While the machine-readable medium 1622 is illustrated as a single medium, the term "machine-readable medium" may include a single medium, or multiple media, (e.g., a centralized or distributed database, and/or associated caches and servers) configured to store the one or more instructions 1624.

The term "machine-readable medium" may include any medium that is capable of storing, encoding, or carrying instructions 1624 for execution by the machine 1600 and that cause the machine 1600 to perform any one or more of the techniques of the present disclosure, or that is capable of storing, encoding, or carrying data structures used by or associated with such instructions 1624. Non-limiting machine-readable medium examples may include solid-state memories, and optical and magnetic media. In an example, a massed machine-readable medium comprises a machine-readable medium 1622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device 1620.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
    identifying, by a machine-learning (ML) model, portion topics with corresponding portion parameters and corresponding portion outcomes in one or more transcripts, the ML model having been trained with data from a training set that comprises training transcripts with identified portion topics with corresponding portion parameters and corresponding portion outcomes within the training transcripts;
    accessing, by one or more processors, transcript data that includes text of multiple transcript portions from the one or more transcripts, each transcript portion among the multiple transcript portions having a corresponding portion topic that is detailed by a corresponding portion parameter and detailed by a corresponding portion outcome;
    providing, by the one or more processors, a user interface (UI) for searching the transcript data based on a specified conjunction of a specified portion topic with at least one of a specified portion parameter or a specified portion outcome;
    performing, by the one or more processors, a search for one or more transcript portions among the multiple transcript portions based on the specified conjunction of the specified portion topic with at least one of the specified portion parameter or the specified portion outcome; and
    causing presentation of results from the performed search within the UI.

2. The method of claim 1, wherein features of the ML model include one or more turns within the one or more transcripts.

3. The method of claim 1, wherein performing the search further comprises:
    converting a single search query into multiple searches; and
    combining results of the multiple searches into one output.

4. The method of claim 1, wherein the UI includes a search option operable to specify a first value for a first state tag, wherein performing the search further comprises:
    identifying one or more transcript portions that include the first value for the first state tag.

5. The method of claim 1, further comprising:
    identifying turns within the transcript data.

6. The method of claim 1, wherein the UI includes a search option operable to specify at least two state tags combined using at least one of an AND comparison operator or an OR comparison operator.

7. The method of claim 6, wherein the UI includes a search option operable to exclude a second state tag from the search.

8. The method of claim 1, further comprising:
creating the transcript data, the creating the transcript data comprising:
obtaining recordings of audio conversations;
performing natural language processing on the recordings to generate raw text without punctation marks and without proper capitalization; and
formatting, by an annotator ML model, the raw text of the audio conversations to generate formatted text.

9. The method of claim 1, wherein the UI includes a search option operable to specify metadata comprising at least one of duration or names of parties.

10. A system, comprising:
one or more memories; and
one or more processors, communicatively coupled to the one or more memories, configured to perform operations comprising:
identifying, by a machine-learning (ML) model, portion topics with corresponding portion parameters and corresponding portion outcomes in one or more transcripts, the ML model having been trained with data from a training set that comprises training transcripts with identified portion topics with corresponding portion parameters and corresponding portion outcomes within the training transcripts;
accessing transcript data that includes text of multiple transcript portions from the one or more transcripts, each transcript portion among the multiple transcript portions having a corresponding portion topic that is detailed by a corresponding portion parameter and detailed by a corresponding portion outcome;
providing a user interface (UI) for searching the transcript data based on a specified conjunction of a specified portion topic with at least one of a specified portion parameter or a specified portion outcome;
performing a search for one or more transcript portions among the multiple transcript portions based on the specified conjunction of the specified portion topic with at least one of the specified portion parameter or the specified portion outcome; and
causing presentation of results from the performed search within the UI.

11. The system of claim 10, wherein features of the ML model include one or more turns within the one or more transcripts.

12. The system of claim 10, wherein the one or more processors are further configured to:
convert a single search query into multiple searches outputting multiple search results; and
combine the multiple search results into a single output.

13. The system of claim 10, wherein the UI includes a search option operable to specify at least two state tags combined using at least one of an AND comparison operator or an OR comparison operator.

14. A non-transitory computer-readable medium storing a set of instructions, the set of instructions comprising:
one or more instructions that, when executed by one or more processors of a computing device, cause the computing device to perform operations comprising:
identifying, by a machine-learning (ML) model, portion topics with corresponding portion parameters and corresponding portion outcomes in one or more transcripts, the ML model having been trained with data from a training set that comprises training transcripts with identified portion topics with corresponding portion parameters and corresponding portion outcomes within the training transcripts;
accessing transcript data that includes text of multiple transcript portions from the one or more transcripts, each transcript portion among the multiple transcript portions having a corresponding portion topic that is detailed by a corresponding portion parameter and detailed by a corresponding portion outcome;
providing a user interface (UI) for searching the transcript data based on a specified conjunction of a specified portion topic with at least one of a specified portion parameter or a specified portion outcome;
performing a search for one or more transcript portions among the multiple transcript portions based on the specified conjunction of the specified portion topic with at least one of the specified portion parameter or the specified portion outcome; and
causing presentation of results from the performed search within the UI.

15. The non-transitory computer-readable medium of claim 14, wherein features of the ML model include one or more turns within the one or more transcripts.

16. The non-transitory computer-readable medium of claim 14, wherein performing the search further comprises:
converting a single search query into multiple searches outputting multiple search results; and
combining the multiple search results into one output.

17. The non-transitory computer-readable medium of claim 14, wherein the UI includes a search option operable to specify at least two state tags combined using at least one of an AND comparison operator or an OR comparison operator.

* * * * *